(12) United States Patent
Nishikawa

(10) Patent No.: US 7,042,644 B2
(45) Date of Patent: May 9, 2006

(54) OPTICAL SUBSTRATE AND DISPLAY DEVICE USING THE SAME

(75) Inventor: Takao Nishikawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 318 days.

(21) Appl. No.: 10/643,517

(22) Filed: Aug. 19, 2003

(65) Prior Publication Data

US 2004/0036823 A1    Feb. 26, 2004

Related U.S. Application Data

(62) Division of application No. 09/457,925, filed on Dec. 8, 1999, now Pat. No. 6,627,125.

(30) Foreign Application Priority Data

Dec. 10, 1998 (JP) ............................... 10-350994

(51) Int. Cl.
*G02B 27/10* (2006.01)

(52) U.S. Cl. ..................... 359/619; 359/891; 349/95; 349/106; 349/110

(58) Field of Classification Search ........ 351/618–623, 351/626, 891; 349/95, 106–110; 427/162; 430/7

See application file for complete search history.

(56) References Cited

U.S. PATENT DOCUMENTS

| 5,739,548 | A | * | 4/1998 | Shigeta et al. ............. 257/59 |
| 6,271,900 | B1 | | 8/2001 | Li |
| 6,304,384 | B1 | | 10/2001 | Nishikawa |
| 6,322,936 | B1 | | 11/2001 | Nishikawa et al. |
| 6,627,125 | B1 | * | 9/2003 | Nishikawa ............... 264/1.7 |

FOREIGN PATENT DOCUMENTS

| JP | 04-030140 | 2/1992 |
| JP | 04-061277 | 2/1992 |
| JP | 04-081702 | 3/1992 |
| JP | 05-072402 | 3/1993 |
| JP | 07-049413 | 2/1995 |
| JP | 07-312377 | 11/1995 |
| JP | 10-004126 | 1/1998 |
| JP | 10-084014 | 3/1998 |
| JP | 10-116855 | 5/1998 |
| JP | 10-125725 | 5/1998 |
| JP | 2000-021935 | 1/2000 |
| JP | 2000-022329 | 1/2000 |
| WO | WO 98/37444 | 8/1998 |

* cited by examiner

*Primary Examiner*—Huy Mai
(74) *Attorney, Agent, or Firm*—Michael T. Gabrick

(57) ABSTRACT

An optical substrate is manufactured such that a bright color display can be achieved. The optical substrate can be embodied in a display device. As for the optical substrate, a light transmitting layer is formed by bonding a first master having a plurality of color protrusions and a second master having a plurality of curved surface parts with a light transmitting layer precursor disposed therebetween so that the resulting light transmitting layer has a plurality of color recesses transferred from the shape of the color protrusions and a plurality of lenses transferred from the shape of the curved surface parts. The master is separated from the light transmitting layer. The color recesses in the light transmitting layer are filled with pigment to form a color pattern layer. The second master is separated from the light transmitting layer.

5 Claims, 14 Drawing Sheets

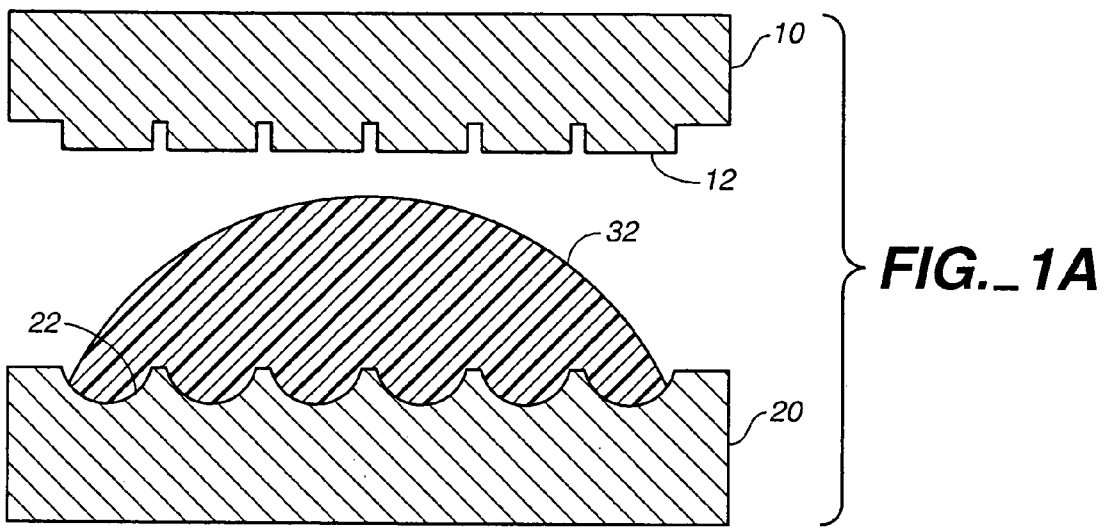
FIG._1A
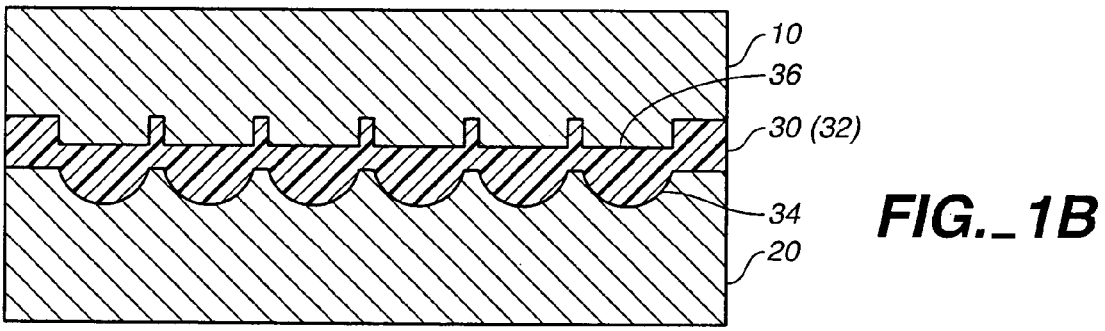
FIG._1B
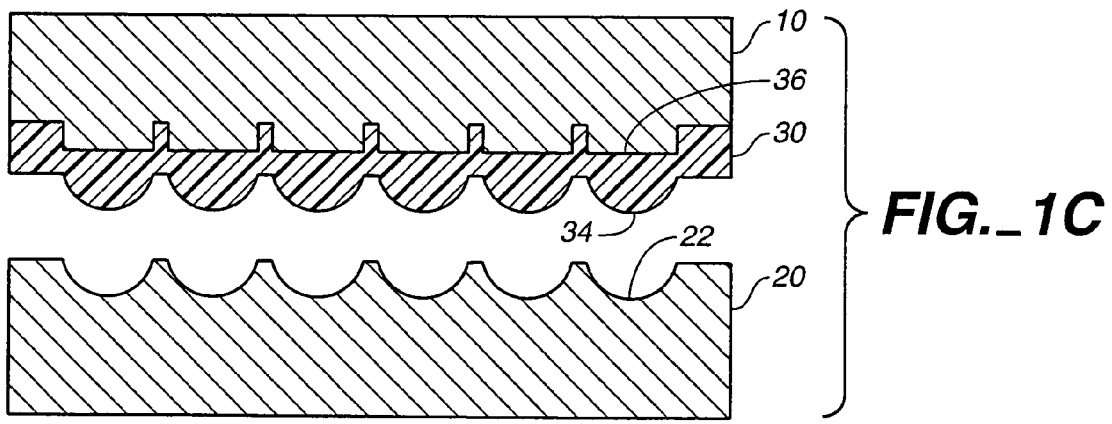
FIG._1C

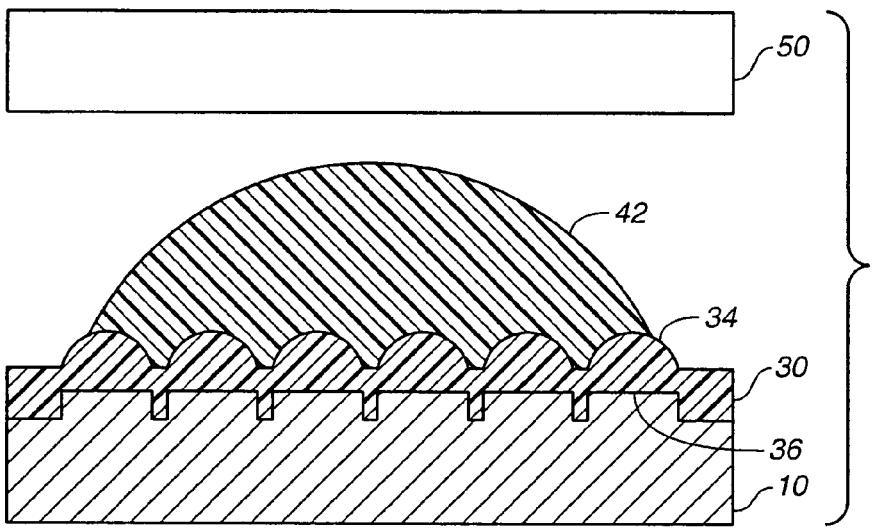
*FIG._2A*
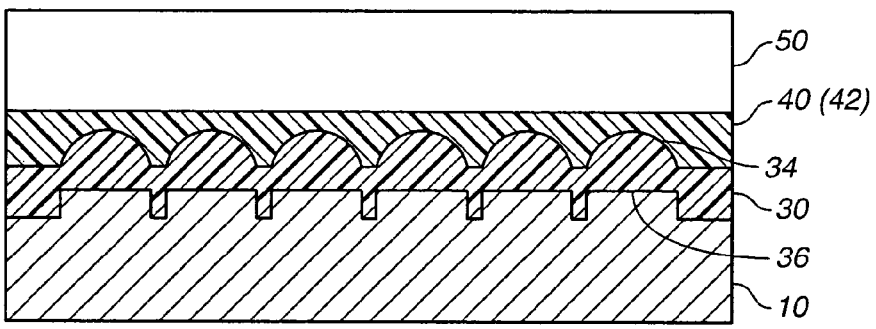
*FIG._2B*
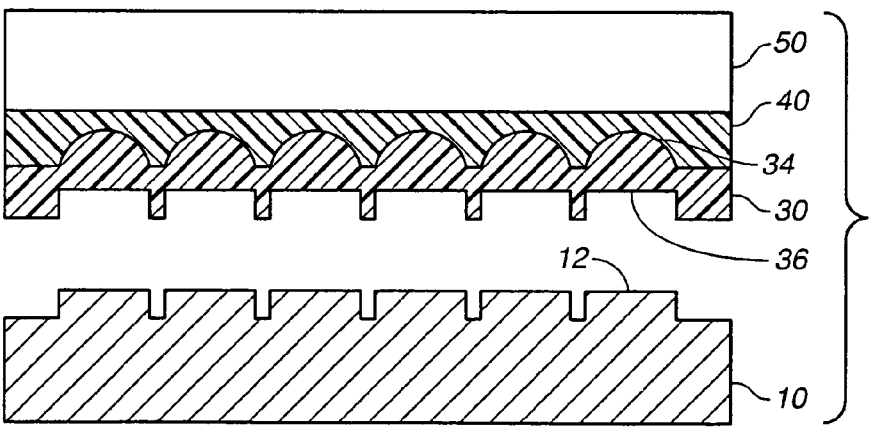
*FIG._2C*

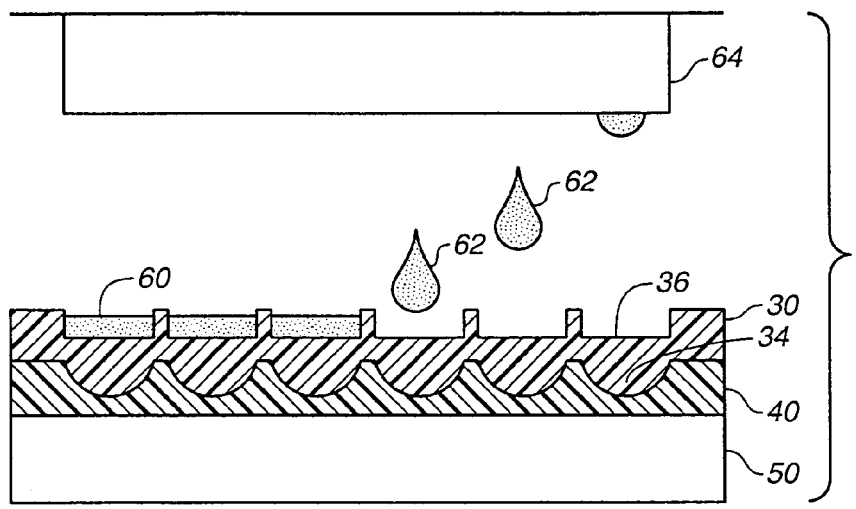
*FIG._3A*
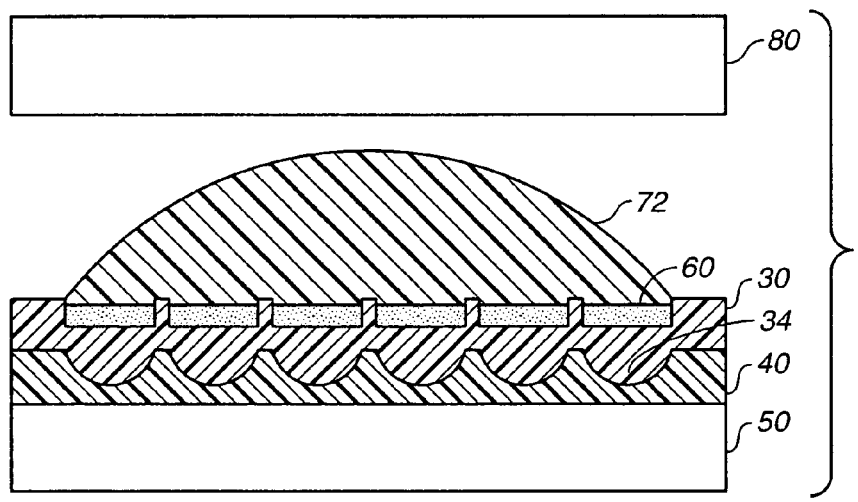
*FIG._3B*
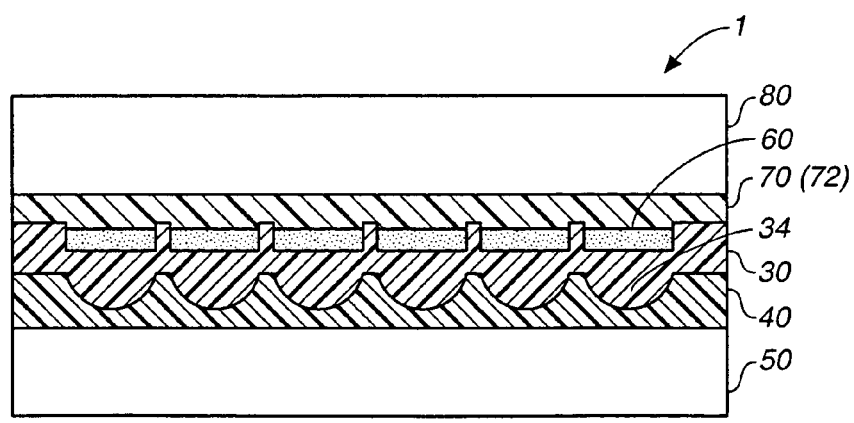
*FIG._3C*

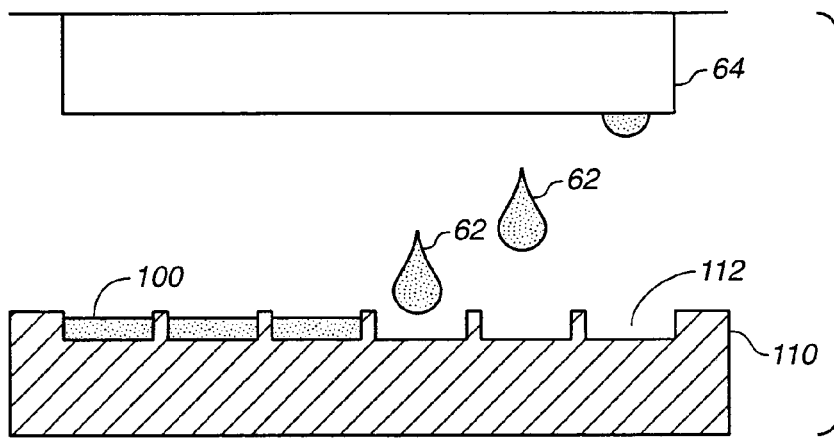
FIG._4A
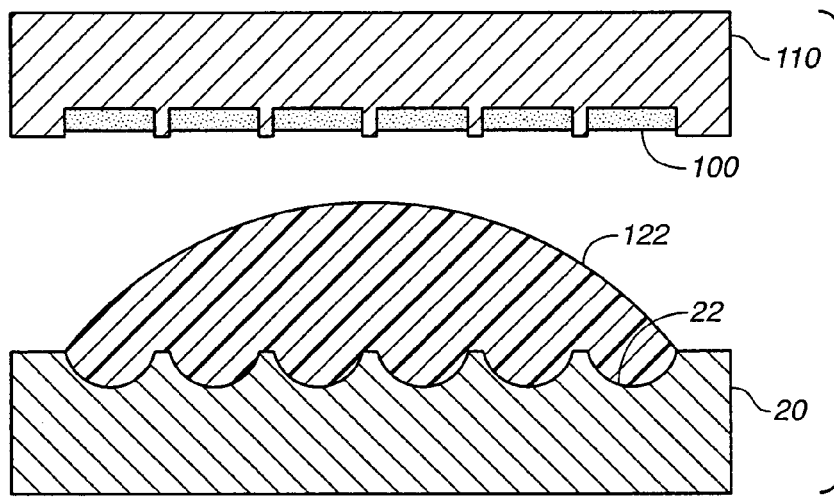
FIG._4B
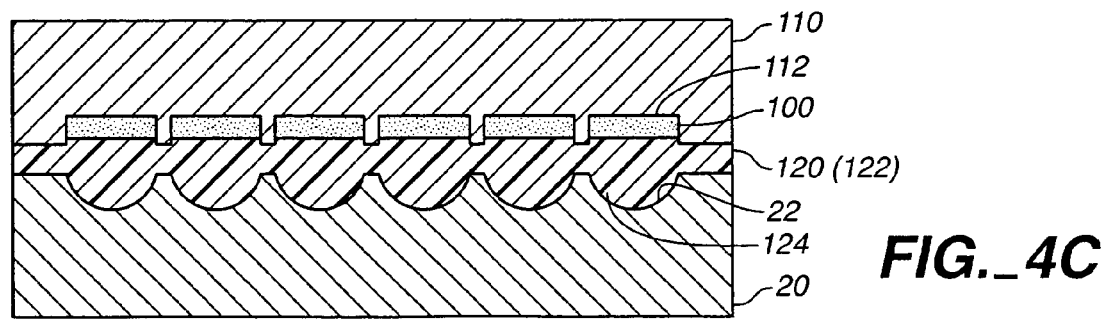
FIG._4C

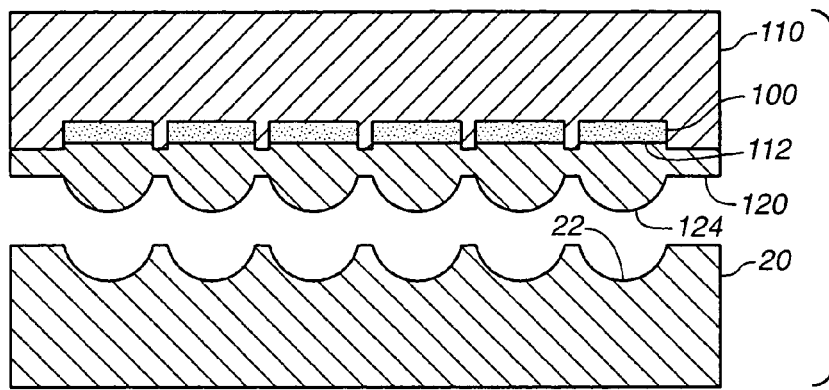
*FIG._5A*
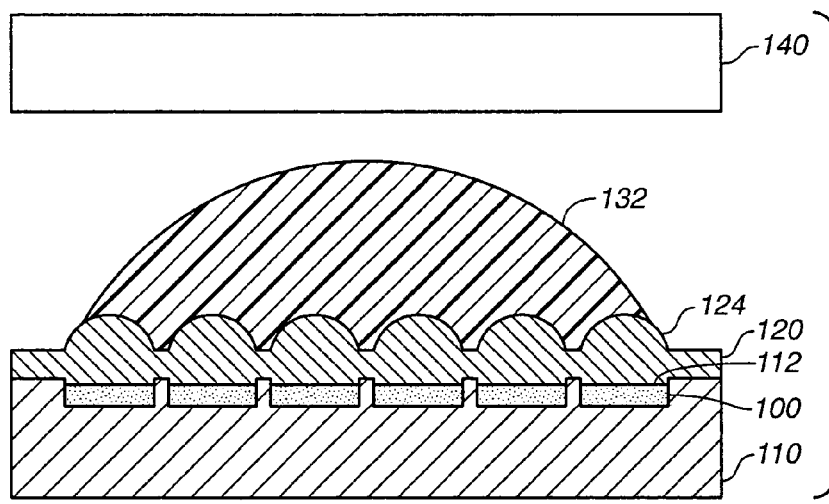
*FIG._5B*
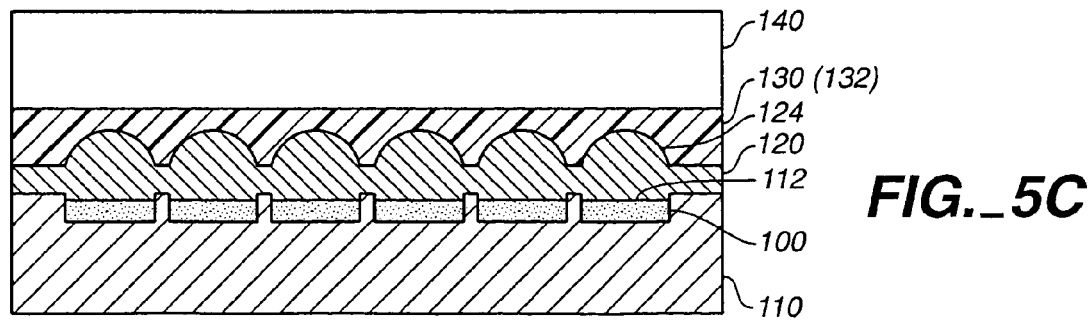
*FIG._5C*

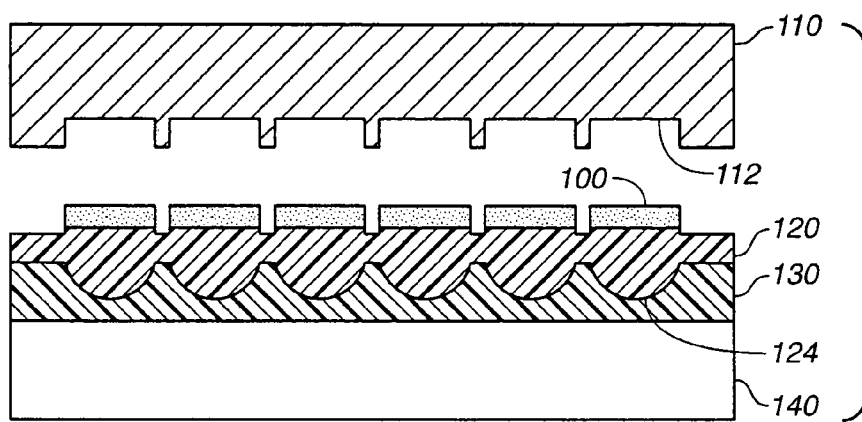
FIG._6A
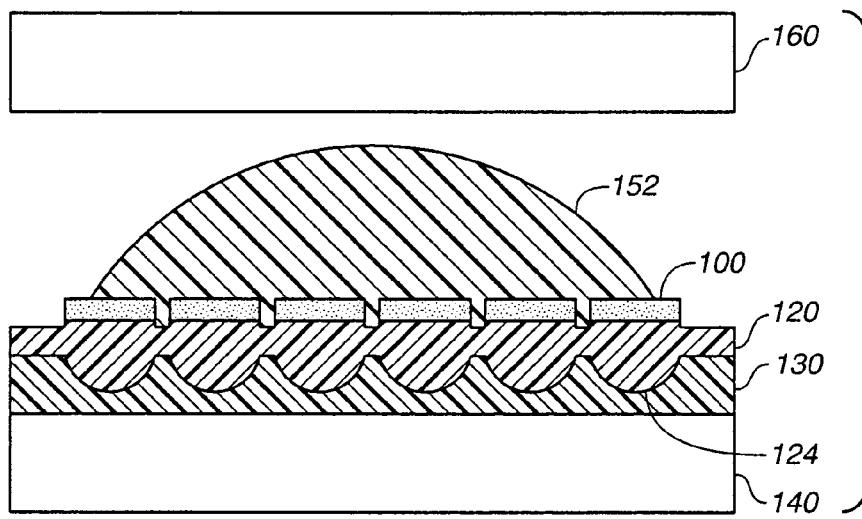
FIG._6B
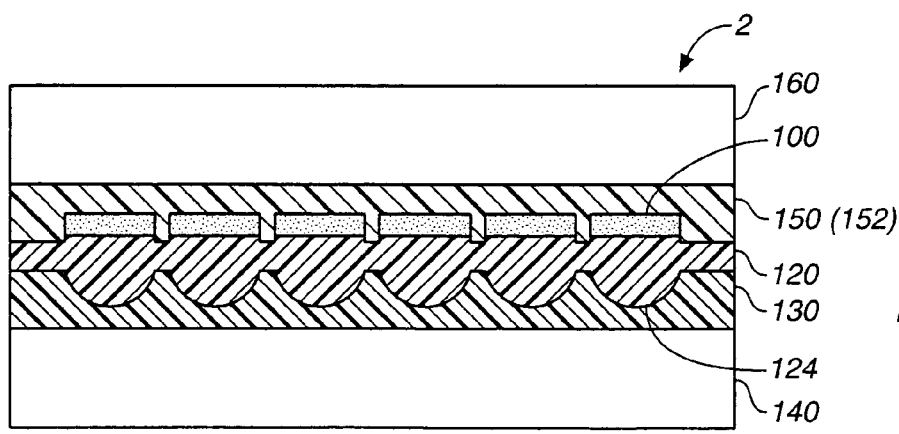
FIG._6C

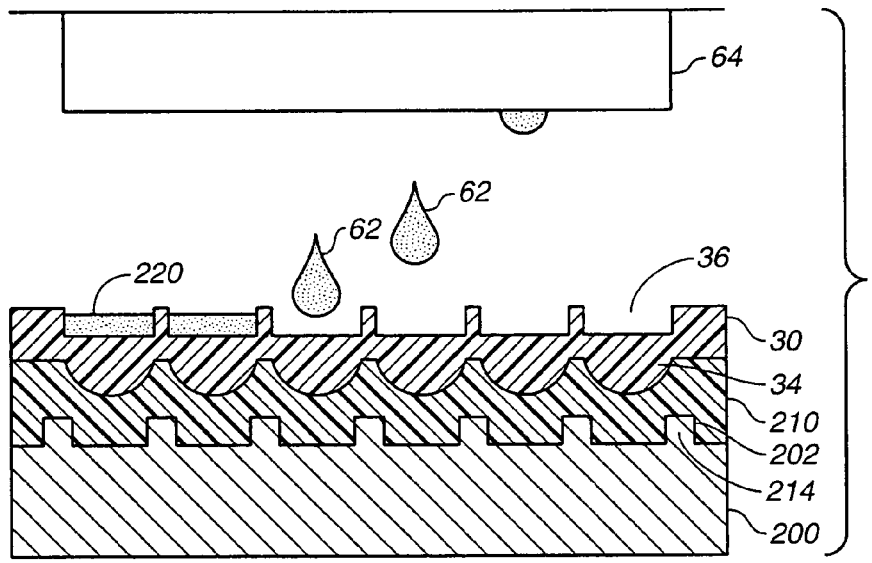
FIG._8A
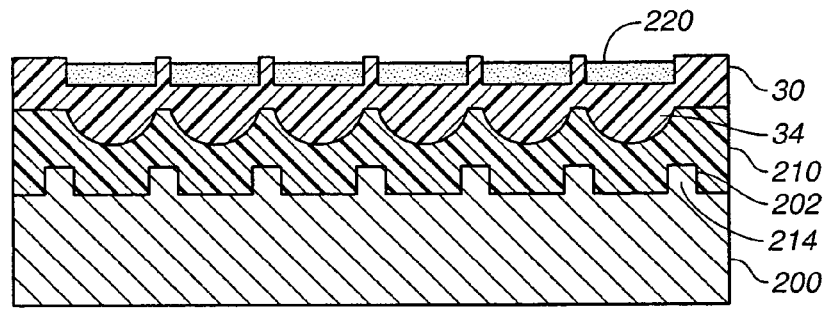
FIG._8B
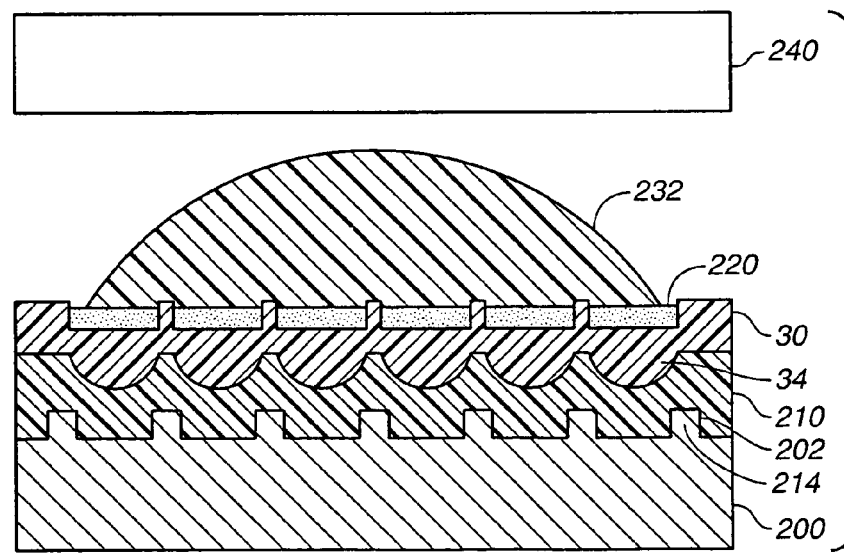
FIG._8C

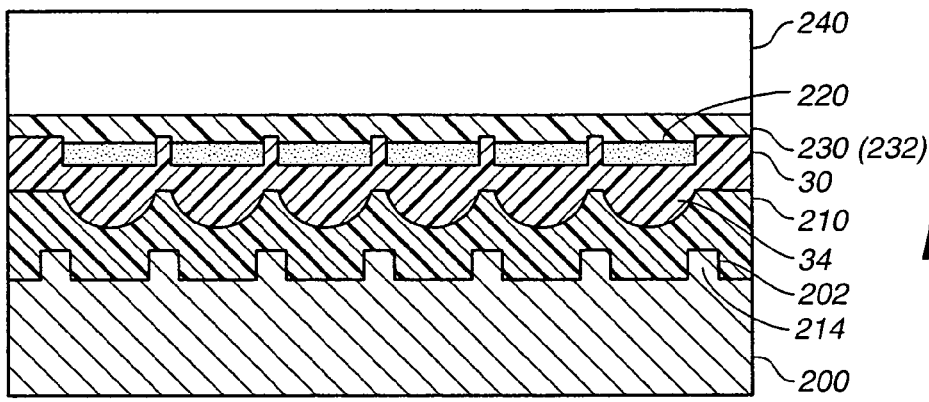
FIG._9A
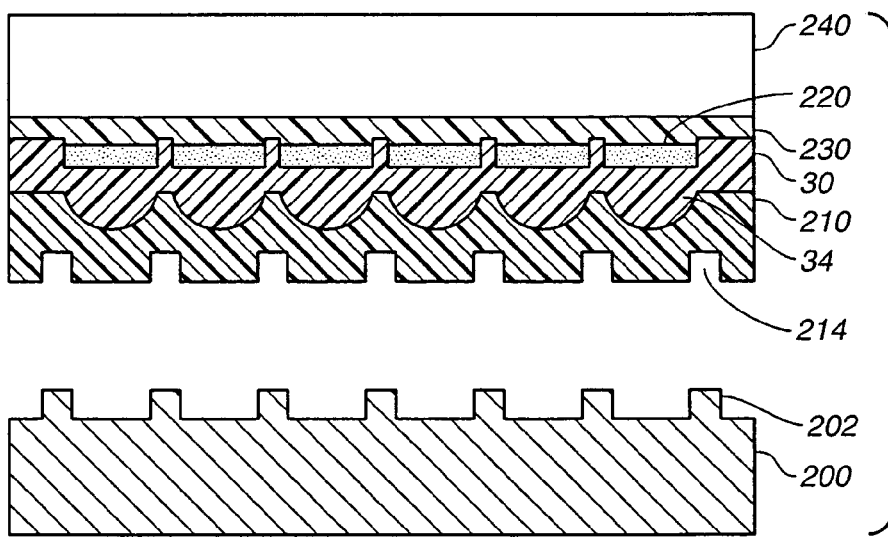
FIG._9B

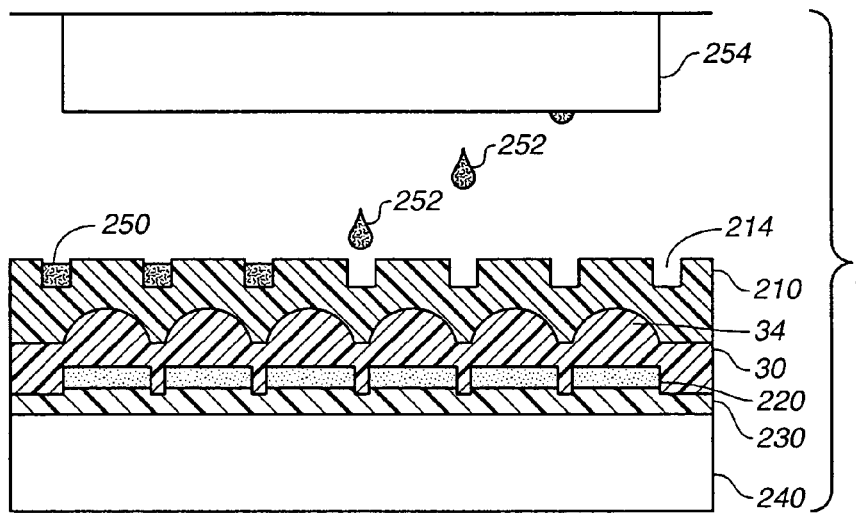
FIG._10A
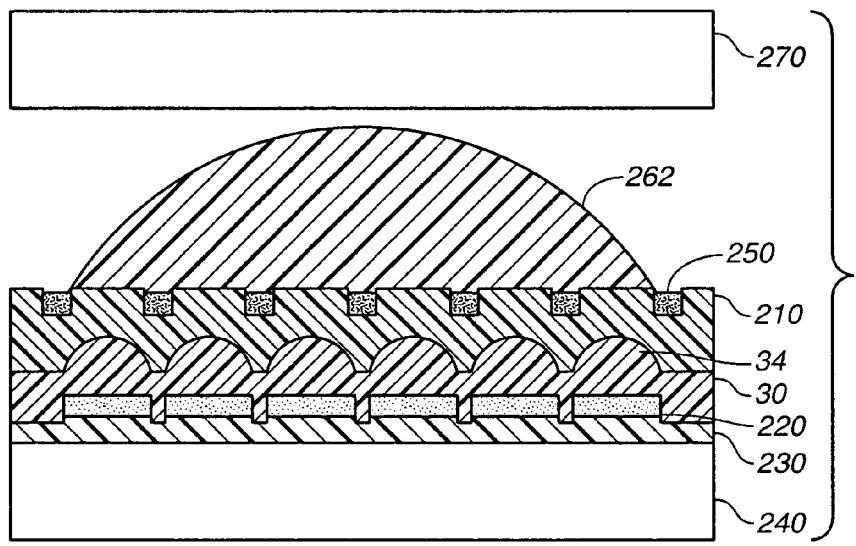
FIG._10B
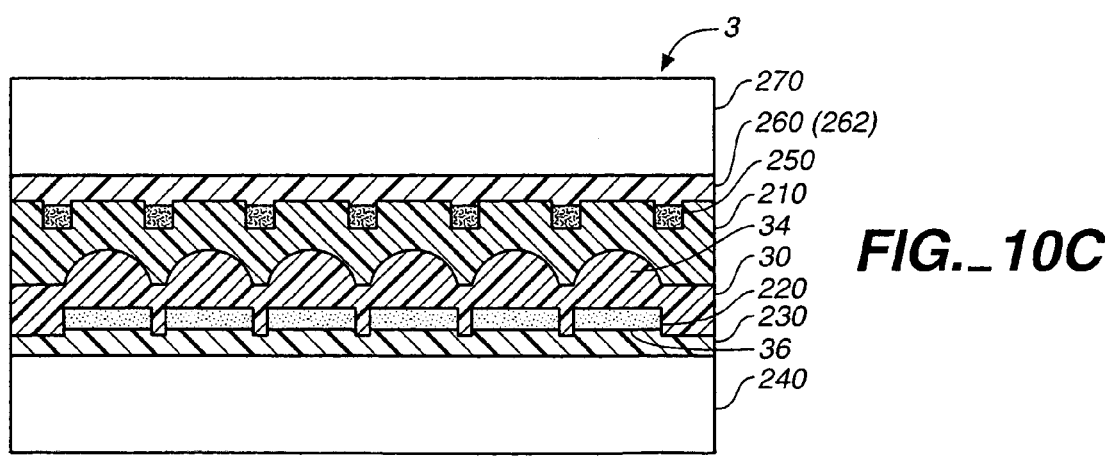
FIG._10C

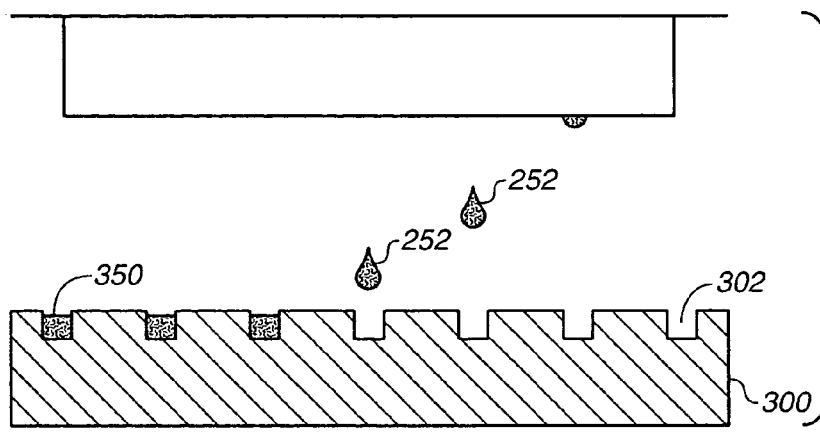
FIG._11A
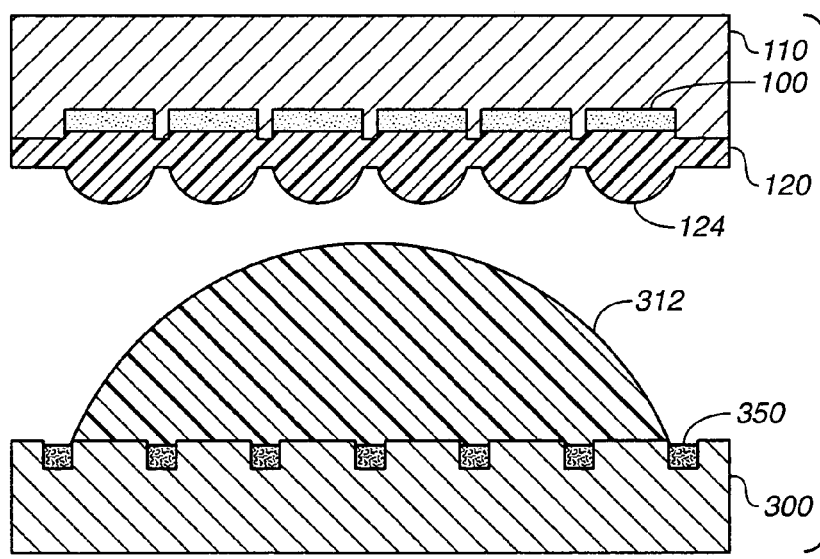
FIG._11B

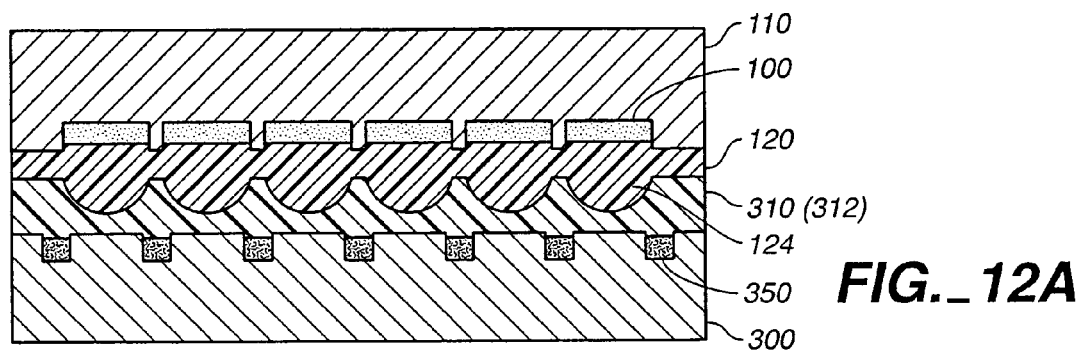
FIG._12A
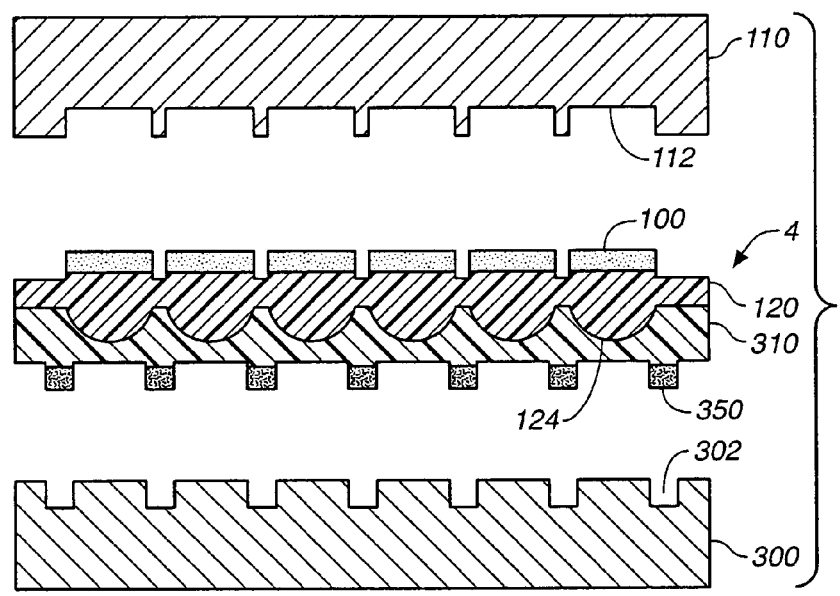
FIG._12B

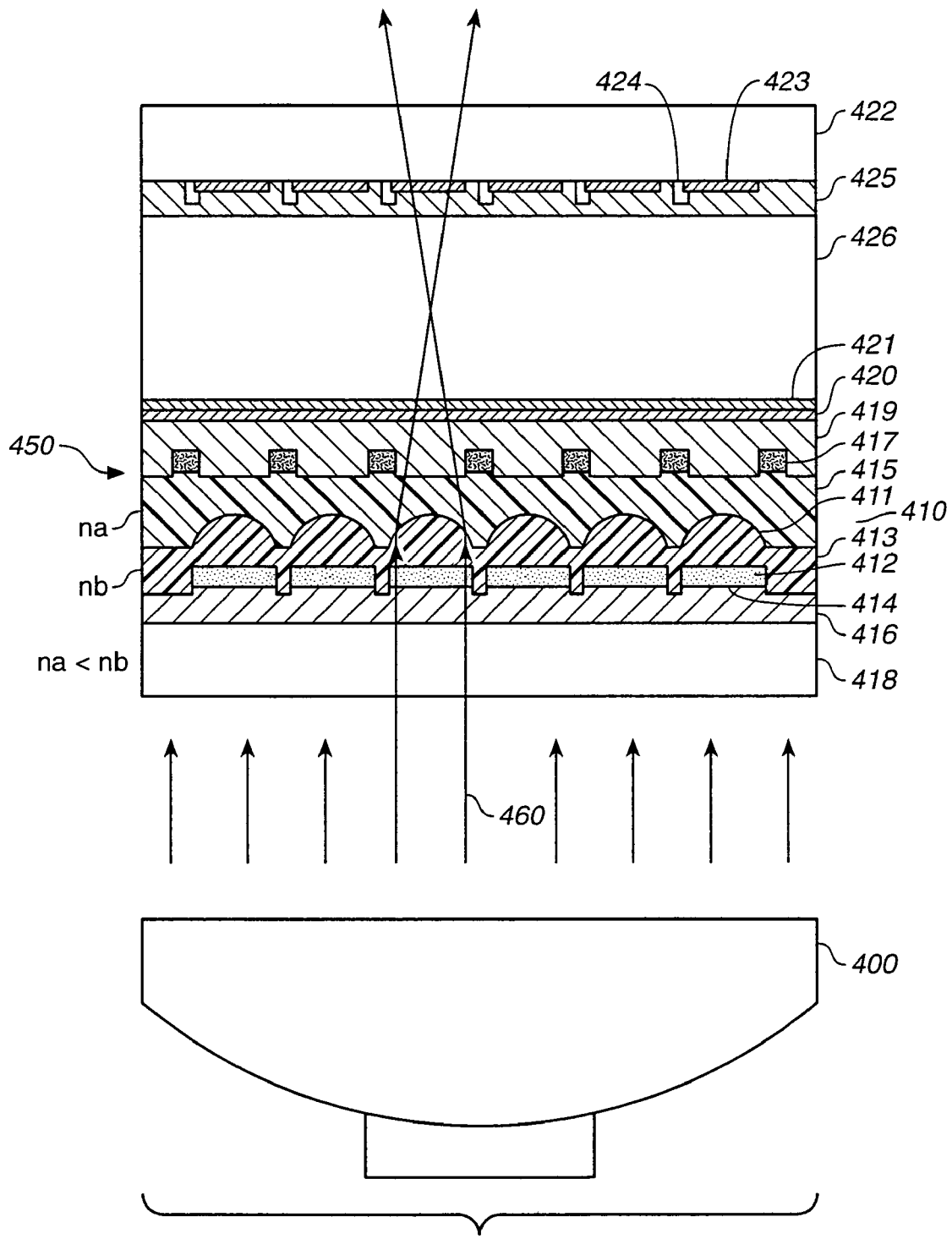
FIG._13

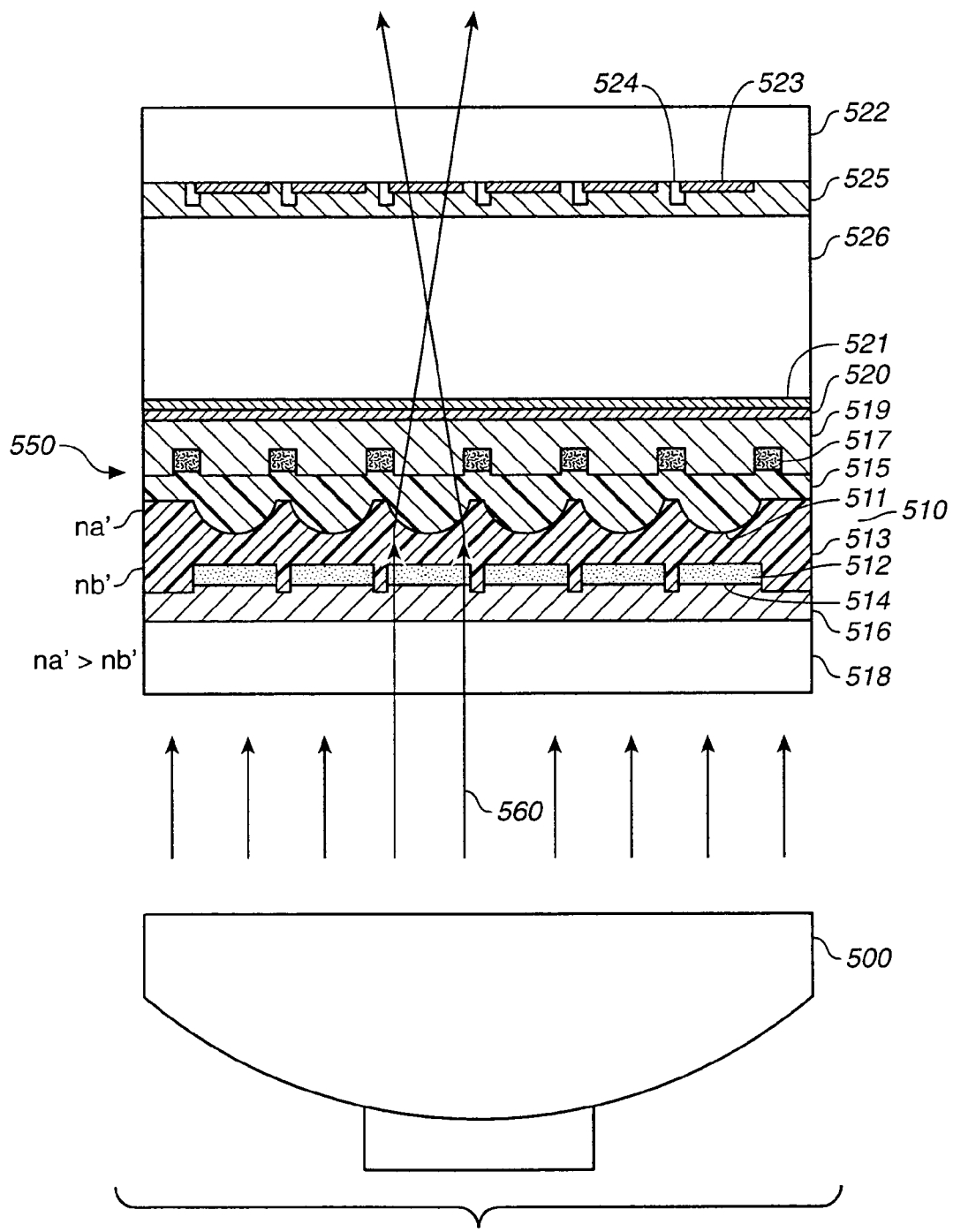
FIG._14

OPTICAL SUBSTRATE AND DISPLAY DEVICE USING THE SAME

CONTINUING APPLICATION DATA

This application is a divisional of U.S. patent application Ser. No. 09/457,925, filed Dec. 8, 1999, now U.S. Pat. No. 6,627,125, which is incorporated herein by reference in its entirety.

BACKGROUND OF THE INVENTION

1. Field of the Invention

The present invention relates to an optical substrate and a display device for the same.

2. Related Art

A method for filling the depressions in a light transmitting layer with pigment has been developed as a method of manufacturing color filters for use with, for example, liquid crystal display panels. The light transmitting layer used in this process can be easily manufactured by dripping resin onto a master having a surface pattern of depressions and protrusions, curing the resin, and then separating the patterned resin from the master.

As a method for manufacturing a microlens array for use with such products as liquid crystal display panels, Japanese Unexamined Patent Application (kokai) 3-198003 teaches a method for manufacturing a microlens array by dripping resin onto a master having a plurality of curved surfaces corresponding to lenses, curing the resin to form a light transmitting layer, and then separating this light transmitting layer to produce the microlens array.

With these methods, however, it is necessary to separately manufacture and then combine the color filter and microlens array.

SUMMARY OF THE INVENTION

The present invention resolves this problem by providing an optical substrate by which a bright color display can be achieved and a display device that uses the optical substrate.

In one embodiment, an optical substrate comprises a light transmitting layer having a plurality of color recesses on one side and a plurality of lenses, aligned with the recesses, on another side; and a color pattern layer formed by pigment in the color recesses.

In another embodiment, an optical substrate comprises a light transmitting layer having a plurality of lenses formed on one side, and a color pattern layer formed on another side of the light transmitting layer.

One side of this optical substrate can thus function as a microlens array while the other side functions as a color filter.

In either embodiment, the optical substrate preferably further comprises a second light transmitting layer formed on the first such layer. The second such layer may have a plurality of light blocking recesses. A light blocking layer is also provided. The light blocking layer is formed on the second light transmitting layer, and may be comprised of light blocking material disposed in the light blocking recesses. The light blocking layer functions as a black matrix and is preferably formed so that each lens is enclosed in one of the areas of the light blocking layer.

A display device according to the present invention comprises an optical substrate constructed in accordance with any of the configurations described above, and further includes a light source for emitting light to the optical substrate.

BRIEF DESCRIPTION OF THE DRAWINGS

FIGS. 1(A) to (C), FIGS. 2(A) to (C), and FIGS. 3(A) to (C) are section views used to describe step by step a manufacturing method for an optical substrate according to a first preferred embodiment of the present invention.

FIGS. 4(A) to (C), FIGS. 5(A) to (C), and FIGS. 6(A) to (C) are section views used to describe step by step a manufacturing method for an optical substrate according to a second preferred embodiment of the present invention.

FIGS. 7(A) to (C), FIGS. 8(A) to (C), FIGS. 9(A) and (B), and FIGS. 10(A) to (C) are section views used to describe step by step a manufacturing method for an optical substrate according to a third preferred embodiment of the present invention.

FIGS. 11(A) and (B) and FIGS. 12(A) and (B) are section views used to describe step by step a manufacturing method for an optical substrate according to a fourth preferred embodiment of the present invention.

FIG. 13 is a section view of an exemplary liquid crystal projector in which is assembled an optical substrate manufactured according to the present invention.

FIG. 14 is a section view of a further exemplary liquid crystal projector in which is assembled an optical substrate manufactured according to the present invention.

DESCRIPTION OF PREFERRED EMBODIMENTS

Figure 7A:
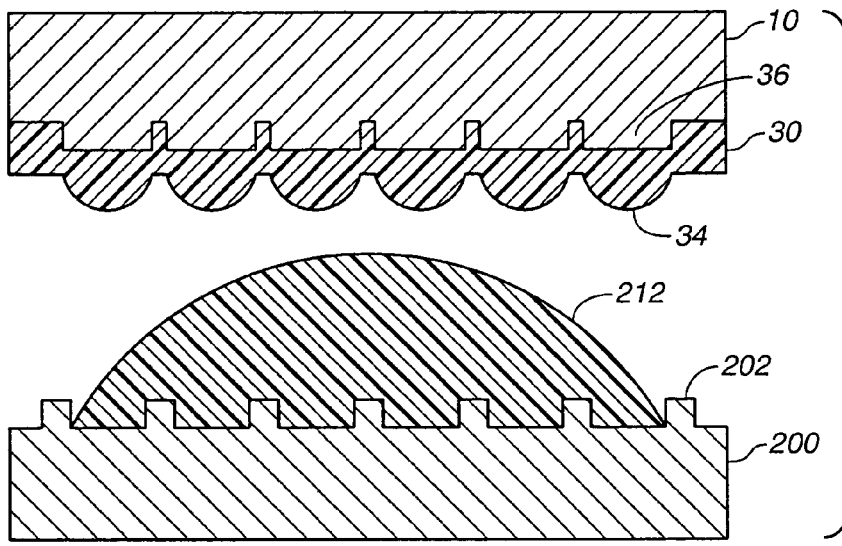

The preferred embodiments of the present invention are described below with reference to the accompanying figures.

Embodiment 1

FIGS. 1(A) to 3(C) are section views used to describe step by step a manufacturing method for an optical substrate according to a first preferred embodiment of the present invention.

As shown in FIG. 1(A), a first master 10 and second master 20 are first prepared. A plurality of protrusions 12 for color is formed on the first master 10. The color protrusions 12 are arranged according to the pixels of a liquid crystal display (LCD) panel. It will be noted that various pixel patterns can be used, including a mosaic, delta, and striped arrangement. A plurality of curved parts 22 is formed on the second master 20. Each of the curved parts 22 is a concavity that is the inverse pattern of a convex lens to be formed therefrom.

The masters 10 and 20 can be formed by etching the surface of a suitable substrate. This substrate is not limited to any particular material so long as it is etchable, but it is preferably of silicon or quartz because of the ease with which these materials can be etched to form high precision color protrusions 12 or curved parts 22.

The first and second masters 10 and 20 are then placed with the color protrusions 12 and curved parts 22 facing each other.

The first master 10 and second master 20 are then bonded with a light transmitting layer precursor 32 disposed therebetween. This light transmitting layer precursor 32 becomes the light transmitting layer 30 shown in FIG. 1(B). It should be noted that while the first master 10 is shown on the top in FIG. 1(A), the second master 20 can alternatively be placed on top.

The light transmitting layer precursor 32 is not limited to any particular material insofar as it is light transmitting. While various materials can thus be used, one that can be set by applying energy is preferable. Such materials can typically be handled as low viscosity fluids during the formation of light transmitting layer 30, and can be easily filled at or near normal room temperature and pressure to the smallest areas of the color protrusions 12 and curved parts 22 on the first and second masters 10 and 20.

Exemplary energy-setting resins can preferably be set by applying either light or heat. Using light or heat makes it possible to use common exposing systems, baking ovens, hot plates, or other heating apparatuses, and thus contribute to lower equipment costs.

Exemplary energy-setting resins include: acrylic resins, epoxy resins, melamine resins, and polyimide resins. Acrylic resins in particular are desirable because a wide range of commercially available precursors and photosensitizers (photopolymerization initiators) can be used, and the resin can be set in a short time by exposure to light.

Specific examples of the basic composition of a photosetting acrylic resin include prepolymers, oligomers, monomers, and photopolymerization initiators.

Exemplary prepolymers and oligomers include: acrylates such as epoxy acrylate, urethane acrylate, polyester acrylate, polyether acrylate, and spiroacetal acrylate; and methacrylates such as epoxy methacrylate, urethane methacrylate, polyester methacrylate, and polyether methacrylate.

Exemplary monomers include: monofunctional monomers such as 2-ethylhexyl acrylate, 2-ethylhexyl methacrylate, 2-hydroxyethyl acrylate, 2-hydroxyethyl methacrylate, n-vinyl-2-pyrrolidone, Carbitol acrylate, tetrahydrofurfuryl acrylate, isobornyl acrylate, dicyclopentenyl acrylate, and 1,3-butanediol acrylate; bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate; and polyfunctional monomers such as trimethylolpropane triacrylate, trimethylolpropane trimethacrylate, pentaerythritol triacrylate, and dipentaerythritol hexacrylate.

Exemplary photopolymerization initiators include: acetophenone compounds such as 2,2-dimethoxy-2-phenyl acetophenone; butyl phenone compounds such as a-hydroxy isobutyl phenone and p-isopropyl-a-hydroxy isobutyl phenone; halogenated acetophenone compounds such as p-tert-butyl dichloro acetophenone, p-tert-butyl trichloro acetophenone, and a,a-dichlor-4-phenoxy acetophenone; benzophenone compounds such as benzophenone [diphenyl ketone], and n,n-tetraethyl-4,4-diamino benzophenone; benzyl compounds such as benzyl, and benzyldimethyl ketal; benzoin compounds such as benzoin and benzoinalkylether; oxime compounds such as 1-phenyl-1,2-propanedione-2-(o-ethoxycarbonyl) oxime; xanthone compounds such as 2-methylthio xanthone, and 2-chlorothio xanthone; benzoin ether compounds such as benzoin ether and isobutyl benzoin ether; and radical forming compounds such as Michler's ketone and benzyl methyl ketal.

Various additives can also be added as required. For example, amines or other compounds can be added to prevent oxygen from inhibiting resin setting, and solvents can be added to improve coating properties. The solvents that can be used include but are not limited to such organic solvents as: propylene glycol monomethylether acetate, methoxymethyl propionate, ethoxyethyl propionate, ethyl lactate, ethyl pyruvate, and methyl amyl ketone.

As noted above, the masters are preferably made from silicon or quartz because of their excellent high precision etchability. In addition to their above-noted properties, the above-noted materials are further preferable because they can be easily separated from such silicon or quartz master materials.

It should be further noted that while the light transmitting layer precursor 32 is described above as being dripped onto the second master 20, it can be alternatively dripped onto the first master 10 or to both the first and second masters 10 and 20. The light transmitting layer precursor 32 can yet further alternatively be deposited on either or both the first and second master 10 and 20 by spin coating, dipping, spray coating, roll coating, bar coating, or other method.

As shown in FIG. 1(B), the light transmitting layer precursor 32 is then spread over a specific area to form a light transmitting layer 30 between the masters 10 and 20. To spread the light transmitting layer precursor 32 over the specific area, a specific pressure can be applied to at least one of the masters 10 and 20.

A setting process appropriate to the composition of the light transmitting layer precursor 32 is then applied through either or both master 10 and 20 to set the light transmitting layer 30.

A plurality of color recesses 36 transferred from the shape of the color protrusions 12 on the first master 10 is thus formed on one surface of the light transmitting layer 30. In addition, a plurality of lenses 34 transferred from the shape of the curved parts 22 in the second master 20 is formed on the other side of the light transmitting layer 30.

As shown in FIG. 1(C), the second master 20 is then separated from the light transmitting layer 30.

Next, as shown in FIG. 2(A), the surface of the first light transmitting layer 30 on which the lenses 34 are formed and a first reinforcing layer 50 are bonded with a second light transmitting layer precursor 42 disposed therebetween to form a second light transmitting layer 40 as shown in FIG. 2(B). The method used to bond by way of intervening first light transmitting layer precursor 32 can be used with this second light transmitting layer precursor 42, which can also be selected from the materials available for use as the first light transmitting layer precursor 32.

The reinforcing layer 50 is typically glass, but the invention shall not be so limited insofar as the desired light transparency, mechanical strength, and other properties can be achieved. Exemplary reinforcing layer 50 materials include plastic plates or films of polycarbonate, polyarylate, polyether sulfone, amorphous polyolefin, polyethylene terephthalate, and polymethyl methacrylate.

Light transmitting layer precursor 42 is then set by a process appropriate to its composition. If a UV-setting acrylic resin is used as the light transmitting layer precursor 42, for example, the light transmitting layer precursor 42 can be set by exposure to ultraviolet light under specific conditions.

The light transmitting layer 30 is then removed from the first master 10 as shown in FIG. 2(C). A plurality of color recesses 36 is formed in the light transmitting layer 30 by the plurality of color protrusions 12 in the first master 10.

A color pattern layer 60 is then formed by filling each of the color recesses 36 with a specified pigment 62 as shown in FIG. 3(A).

While no particular method must be used for filling the color recesses 36 with pigment 62, an ink jet method is preferred. Ink jet spray methods have been proven in ink jet printers, and enable the color recesses 36 to be filled quickly, economically, and without waste.

FIG. 3(A) shows the color recesses 36 being filled with typically red, green, and blue pigment 62 using an ink jet head 64. More specifically, the ink jet head 64 is positioned appropriately to the color recesses 36, and pigment 62 of the appropriate color is ejected therefrom into each color recess 36.

The ink jet head 64 can be any type of print head used in an ink jet printer, including piezo jet types using piezoelectric elements, and types that use an electro-thermal conversion element as the energy generating means for expanding the ink volume or vaporizing the ink to generate pressure whereby the ink is sprayed from the ink jet head. Ink jet heads 64 such as these enable both coverage and the ejection pattern to be controlled as desired.

For example, if an ink jet head 64 having an array of 64 nozzles for ejecting pigment 62 is used, and three drops are ejected into each color recess 36 at a drive frequency of 14.4 kHz (ejecting 14,400 drops per second), the time required to fill each of the color recesses 36 in an approximately 900,000 pixel display panel with pigment 62 is: 900,000×3 drops/(14,400 times×64 nozzles)=approximately 3 seconds. Even considering the time required to move the ink jet head 64 between color recesses 36, all color recesses 36 can be filled with pigment 62 in approximately two to three minutes. To assure the color recesses 36 are filled with a uniform amount of pigment 62, the ink jet head 64 is moved and otherwise controlled to control the position at which pigment is ejected.

When the pigment 62 contains solvent, the solvent is evaporated by heat treatment. Removing the solvent, however, causes the pigment 62 to contract. It is therefore necessary to fill the recesses with enough pigment 62 so that the thickness needed to assure the required color density remains after solvent evaporation and pigment shrinkage.

This process forms a color pattern layer 60 on the light transmitting layer 30 as shown in FIG. 3(B).

A second reinforcing layer 80 is then bonded to the color pattern layer 60 side of the light transmitting layer 30 with a third light transmitting layer precursor 72 disposed therebetween. This operation is the same as that for bonding with the first light transmitting layer precursor 32, and the light transmitting layer precursor 72 can also be selected from the materials available for use as light transmitting layer precursor 32.

By thus spreading the third light transmitting layer precursor 72 and applying an appropriate setting process to form a third light transmitting layer 70 as shown in FIG. 3(C), optical substrate 1 is achieved.

As will be known from the above description, this optical substrate 1 comprises first to third light transmitting layers 30, 40, and 70 disposed between first and second reinforcing layers 50 and 80. A color pattern layer 60 is formed by filling the plurality of color recesses 36 formed on one side of the first light transmitting layer 30 with pigment 62. In addition, a plurality of lenses 34 is formed on the other side of the first light transmitting layer 30. Furthermore, the pixels of the color pattern layer 60 are formed at positions corresponding to the lenses 34.

An optical substrate 1 according to this preferred embodiment thus has the functionality of both a color filter incorporating the color pattern layer 60, and a microlens array incorporating the lenses 34. As a result, a bright color display can be achieved.

It should be noted that if the second and third light transmitting layers 40 and 70 can provide the mechanical strength, gas barrier properties, chemical resistance, and other properties required for the optical substrate, the corresponding first and second reinforcing layers 50 and 80 can be removed. In this case the second and third light transmitting layers 40 and 70 become protective films for the first light transmitting layer 30. Moreover, if the light transmitting layer 30 itself has sufficient strength, the second and third light transmitting layers 40 and 70 can also be omitted.

As described above, color recesses 36 and lenses 34 can be easily formed by transfer to a light transmitting layer 30 according to the present invention. With this method there is highly efficient use of material, the number of production steps can be reduced, and cost reduction can be achieved.

Furthermore, once manufactured, the first and second masters 10 and 20 can be used repeatedly insofar as durability allows. The steps required to produce the masters 10 and 20 can therefore be eliminated from the production process for the second and subsequent optical substrates, thereby further reducing the number of production steps and helping to further reduce cost.

Embodiment 2

FIGS. 4(A) to FIG. 6(C) are section views used to describe step by step a manufacturing method for an optical substrate according to a second preferred embodiment of the present invention.

A first master 110 as shown in FIG. 4(A) is used in this preferred embodiment of the invention. A plurality of recesses 112 for color is formed on the first master 110. The color recesses 112 are arranged according to the pixels of a display device. It will be noted that various pixel patterns can be used, including a mosaic, delta, and striped arrangement.

The first master 110 can be formed by etching the surface of a suitable substrate. This substrate is not limited to any particular material so long as it is etchable, but it is preferably of silicon or quartz because of the ease with which these materials can be etched to form high precision color recesses 112.

A color pattern layer 100 is then formed in the color recesses 112 of the first master 110. This process is identical to that shown in FIG. 3(A) and described above, and the color pattern layer 100 can thus be formed by filling the color recesses 112 with a pigment 62 using an ink jet head 64.

Next, the surface of the first master 110 on which the color pattern layer 100 is formed, and the curved parts 22 side of a second master 20 identical to that used in the first embodiment described above, are bonded with a first light transmitting layer precursor 122 therebetween. This process is the same as that used for bonding by means of intervening light transmitting layer precursor 32 of the first embodiment. The light transmitting layer precursor 122 can also be selected from the materials available for use as the above-noted light transmitting layer precursor 32.

A first light transmitting layer 120 is thus formed between the first and second masters 110 and 20 as shown in FIG. 4(C). To spread the light transmitting layer precursor 122 over the specific area, a specific pressure can be applied to at least one of the masters 110 and 20. A setting process appropriate to the composition of the light transmitting layer precursor 122 is then applied through either or both master 110 and 20 to set the light transmitting layer 120.

The color pattern layer 100 formed in the color recesses 112 of the first master 110 is bonded to one side of the first light transmitting layer 120. A plurality of lenses 124 transferred from the profile of the curved parts 22 is formed on the other side of the first light transmitting layer 120.

Next, as shown in FIG. 5(A), the second master 20 is separated from the light transmitting layer 120.

Then, as shown in FIG. 5(B), the surface of the first light transmitting layer 120 on which the lenses 124 are formed and a first reinforcing layer 140 are bonded with a second light transmitting layer precursor 132 disposed therebetween to form a second light transmitting layer 130 as shown in FIG. 5(C). This process can be the same as that used to spread and bond the first light transmitting layer precursor 32 in the first embodiment above. The light transmitting layer precursor 132 can also be selected from the above-noted materials available for use as light transmitting layer precursor 32.

Any of the materials usable for the reinforcing layer 50 in the first embodiment can also be used for this reinforcing layer 140. The light transmitting layer precursor 132 is also set using a process appropriate to its composition.

Referring next to FIG. 6(A), the first master 110 is removed from the first light transmitting layer 120 and color pattern layer 100. This leaves the color pattern layer 100 transferred from the profile of the color recesses 112 in the first master 110 molded integrally to the first light transmitting layer 120.

Next, the surface of the light transmitting layer 120 on which the color pattern layer 100 is formed and a second reinforcing layer 160 are bonded with a third light transmitting layer precursor 152 therebetween. This process is the same as that used to bond by way of intervening light transmitting layer precursor 32 of the first embodiment. The light transmitting layer precursor 152 can also be selected from the materials available for use as the above-noted light transmitting layer precursor 32.

By thus spreading the third light transmitting layer precursor 152 and applying an appropriate setting process to form a third light transmitting layer 150 as shown in FIG. 6(C), optical substrate 2 is achieved.

This optical substrate 2 comprises first to third light transmitting layers 120, 130, and 150 disposed between first and second first reinforcing layers 140 and 160. A color pattern layer 100 is formed integrally to one side of the first light transmitting layer 120. A plurality of lenses 124 is formed on the other side of the first light transmitting layer 120. Furthermore, the pixels of the color pattern layer 100 are formed at positions corresponding to the lenses 124.

This optical substrate 2 has the functionality of both a color filter incorporating the color pattern layer 100, and a microlens array incorporating the lenses 124. As a result, a bright color display can be achieved.

It should be noted that if the second and third light transmitting layers 130 and 150 can provide the desired mechanical strength, gas barrier properties, chemical resistance, and other properties required for the optical substrate, the corresponding first and second reinforcing layers 140 and 160 can be removed. In this case the second and third light transmitting layers 130 and 150 become protective films for the first light transmitting layer 120. Moreover, if the light transmitting layer 120 itself has sufficient strength, the second and third light transmitting layers 130 and 150 can also be omitted.

As described above, lenses 124 can be easily formed in a light transmitting layer 120 by transfer according to the present embodiment of the invention. It is therefore possible by means of this method to achieve highly efficient use of material, a reduction in the number of production steps, and cost reduction.

Furthermore, once manufactured, the first and second masters 110 and 20 can be used repeatedly insofar as durability allows. The steps required to produce the masters 110 and 20 can therefore be eliminated from the production process for the second and subsequent optical substrates, thereby further reducing the number of production steps and helping to further reduce cost.

Embodiment 3

FIGS. 7(A) to FIG. 10(C) are section views used to describe step by step a manufacturing method for an optical substrate according to a third preferred embodiment of the present invention.

A manufacturing method according to this preferred embodiment uses first and second masters 10 and 20 to manufacture a first light transmitting layer 30 as shown in FIG. 1(A) and FIG. 1(B). This first light transmitting layer 30 thus has a plurality of color recesses 36 on one side and a plurality of lenses 34 on the other. The second master 20 is then removed from the resulting light transmitting layer 30 as shown in FIG. 1(C).

A third master 200 is then prepared as shown in FIG. 7(A). This third master 200 has a light blocking protrusion 202 segmenting a plurality of areas. In plan view the light blocking protrusion 202 has the shape of a black matrix for use in an LCD panel, and segments areas corresponding to the plurality of pixels. It should be noted that the pattern of this black matrix corresponds to the mosaic, delta, striped, or other pixel arrangement.

The lens 34 surface side of the first light transmitting layer 30 and the third master 200 are then bonded with a second light transmitting layer precursor 212 disposed therebetween. The method used for bonding in the first embodiment above can be used here. It will also be noted that while the third master 200 is shown on the bottom in FIG. 7(A), the first light transmitting layer 30 can be alternatively placed on the bottom. The second light transmitting layer precursor 212 can also be selected from any of the materials usable for the first light transmitting layer precursor 32 in the first embodiment.

Figure 7B:
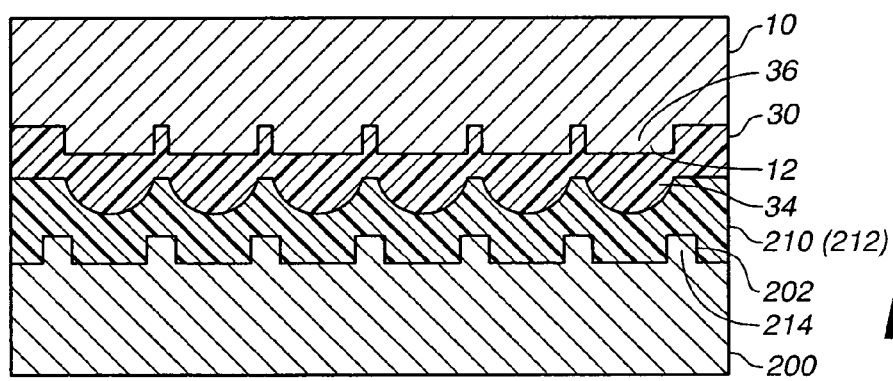

Next, as shown in FIG. 7(B), the second light transmitting layer precursor 212 is spread over a specific area to form a second light transmitting layer 210 between the third master 200 and first light transmitting layer 30. The second light transmitting layer precursor 212 can be spread by applying a specific pressure as required to either master 10 or 200. A setting process appropriate to the composition of the second light transmitting layer precursor 212 is then applied from either master 10 or 200 to set the second light transmitting layer 210.

One side of the second light transmitting layer 210 has concavities corresponding to the profile of the lenses 34 on the first light transmitting layer 30. A light blocking recess 214 is transferred from the shape of the light blocking protrusion 202 in the third master 200 to the other side of the second light transmitting layer 210. The shape of the light blocking recess 214 in plan view is that of a black matrix used in an LCD panel segmented into areas corresponding to a plurality of pixels. It should be noted that the pattern of this black matrix corresponds to the mosaic, delta, striped, or other pixel arrangement.

Figure 7C:
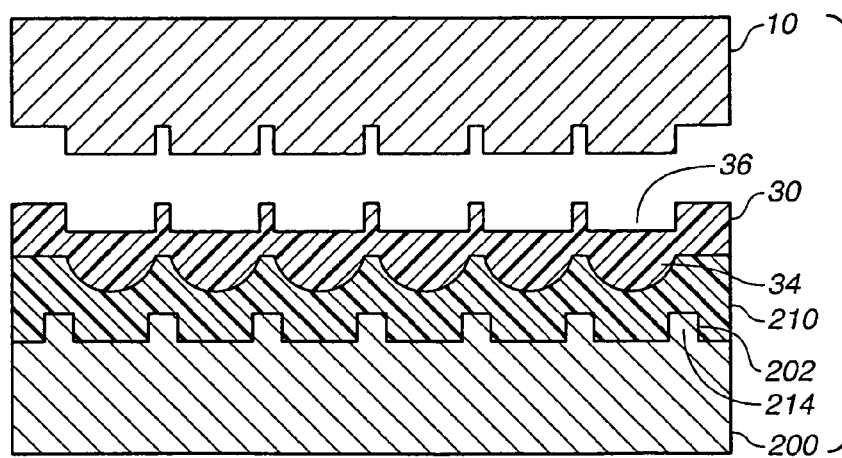

The first master 10 is then separated from the light transmitting layer 30 as shown in FIG. 7(C). The light transmitting layer 30 has a plurality of color recesses 36 formed by the plurality of color protrusions 12 in the first master 10.

The color recesses 36 are then filled with a predetermined pigment 62 to form a color pattern layer 220 as shown in FIG. 8(A). This operation is described in detail in the first embodiment above, and further description is therefore omitted here.

A color pattern layer 220 is thus formed on the light transmitting layer 30 as shown in FIG. 8(B). The color pattern layer 220 side of the light transmitting layer 30 and a first reinforcing layer 240 are then bonded with a third light transmitting layer precursor 232 disposed therebetween. This process is the same as that used for bonding by way of intervening light transmitting layer precursor 32, and the light transmitting layer precursor 232 can also be selected from any of the materials usable for the light transmitting layer precursor 32, in the first embodiment.

A third light transmitting layer 230 as shown in FIG. 9(A) is formed by thus spreading the third light transmitting layer precursor 232 and then applying an appropriate setting process.

The third master 200 is then separated from the second light transmitting layer 210 as shown in FIG. 9(B). The light blocking recess 214 transferred from the light blocking protrusion 202 of the third master 200 is thus formed on the second light transmitting layer 210.

The light blocking recess 214 is then filled with a light blocking material 252 to form an opaque layer 250 as shown in FIG. 10(A). It is to be noted that the light blocking recess 214 is positioned to surround each pixel in the color pattern layer 220 so that the opaque layer 250 forms a black matrix.

Various materials can be used for the light blocking material 252 insofar as the selected material does not pass light and is sufficiently durable. For example, the light blocking material 252 can be a binder resin dissolved in solvent with a black dye or pigment. The solvent type is not specifically limited, and can be water or a variety of organic solvents. Exemplary organic solvents include: propylene glycol monomethylether acetate, propylene glycol monopropylether, methoxymethyl propionate, ethoxyethyl propionate, ethyl cellusolve, ethyl cellusolve acetate, ethyl lactate, ethyl pyruvate, methyl amyl ketone, cyclohexanone, xylene, toluene, and butyl acetate. These solvents can further be used singly or in mixtures thereof.

Various methods can be used to fill the light blocking recess 214 with light blocking material 252, but an ink jet method is preferable. Ink jet methods have been proven in ink jet printers, and enable the light blocking recess 214 to be filled quickly, economically, and without waste. The ink jet head 254 in this case is positioned and driven appropriately to evenly fill the light blocking recess 214 in the second light transmitting layer 210 with light blocking material 252.

Once the light blocking recess 214 is uniformly filled throughout with light blocking material 252, filling stops. If the light blocking material 252 contains solvent, the solvent is removed by heat treatment. Removing the solvent, however, causes the material to contract. It is therefore necessary to fill the recesses with enough material so that the thickness needed to assure the required opacity remains after solvent evaporation and material shrinkage.

An opaque layer 250 is thus formed on the second light transmitting layer 210 as shown in FIG. 10(B). The opaque layer 250 side of light transmitting layer 210 and a second reinforcing layer 270 are then bonded with a fourth light transmitting layer precursor 262 disposed therebetween. This process is the same as that used for bonding by way of intervening light transmitting layer precursor 32 in the first embodiment above, and light transmitting layer precursor 262 can also be selected from any of the materials usable for the light transmitting layer precursor 32 in the first embodiment.

An optical substrate 3 is achieved by thus spreading the fourth light transmitting layer precursor 262 and applying an appropriate setting process to form the fourth light transmitting layer 260 as shown in FIG. 10(C).

Optical substrate 3 comprises first to fourth light transmitting layers 30, 210, 230, and 260 disposed between first and second first reinforcing layers 240 and 270. In addition, a color pattern layer 220 is formed by filling pigment 62 to the plurality of color recesses 36 formed on one side of the first light transmitting layer 30. A plurality of lenses 34 is formed on the other side of the first light transmitting layer 30. The pixels of the color pattern layer 220 are furthermore each aligned with a corresponding lens 34.

This optical substrate 3 thus has the functionality of both a color filter incorporating the color pattern layer 220, and a microlens array incorporating the lenses 34. As a result, a bright color display can be achieved.

It should be noted that if the third and fourth light transmitting layers 230 and 260 can provide the mechanical strength, gas barrier properties, chemical resistance, and other properties required for the optical substrate, the corresponding first and second reinforcing layers 240 and 270 can be removed. In this case the third and fourth light transmitting layers 230 and 260 become protective films for the first and second light transmitting layers 30 and 210. Moreover, if the light transmitting layers 30, 210 themselves have sufficient strength, the third and fourth light transmitting layers 230 and 260 can also be omitted.

As described above, color recesses 36 and lenses 34 can be easily formed in the light transmitting layer 30 by a transfer process according to the present invention. It is therefore possible by means of this method to achieve highly efficient use of material, a reduction in the number of production steps, and cost reduction.

Furthermore, once manufactured, the first to third masters 10, 20, and 200 can be used repeatedly insofar as durability allows. The steps required to produce the masters can therefore be eliminated from the production process for the second and subsequent optical substrates, thereby further reducing the number of production steps and helping to further reduce cost.

Embodiment 4

FIGS. 11(A) to FIG. 12(B) are section views used to describe step by step a manufacturing method for an optical substrate according to a fourth preferred embodiment of the present invention.

In this preferred embodiment a first light transmitting layer 120 and color pattern layer 100 are manufactured using first and second masters 110 and 20 as shown in FIG. 4(A) to FIG. 5(A) according to the second embodiment of the invention. A third master 300 as shown in FIG. 11(A) is also prepared.

A light blocking recess 302 is formed in the third master 300. The shape of the light blocking recess 300 in plan view is that of a black matrix used in an LCD panel, segmenting areas corresponding to a plurality of pixels. It should be noted that the pattern of this black matrix corresponds to the mosaic, delta, striped, or other pixel arrangement. The light blocking recess 302 of the third master 300 is filled with a light blocking material 252 to form light blocking layer 350. This is identical to the process described above with reference to FIG. 10(A).

The lens 124 side of the light transmitting layer 120 and the light blocking layer 350 side of the third master 300 are then bonded with a second light transmitting layer precursor 312 disposed therebetween as shown in FIG. 11(B). This process is identical to the process for bonding by way of intervening light transmitting layer precursor 32 described in the first embodiment, and light transmitting layer precursor 312 can also be selected from any of the materials usable for the light transmitting layer precursor 32 in the first embodiment.

A second light transmitting layer 310 as shown in FIG. 12(A) is formed by thus spreading the second light transmitting layer precursor 312 and then applying an appropriate setting process.

The first master 110 is then separated from the first light transmitting layer 120 and color pattern layer 100 as shown in FIG. 12(B). The third master 300 is also separated from the second light transmitting layer 310 and light blocking layer 350. The result is optical substrate 4.

This optical substrate 4 comprises first and second light transmitting layers 120 and 310; a color pattern layer 100 formed on first light transmitting layer 120; and a light blocking layer 350 on second light transmitting layer 310. Lenses 124 are also formed on the first light transmitting layer 120.

Optical substrate 4 thus has the mechanisms of both a color filter incorporating the color pattern layer 100, and a microlens array incorporating the lenses 124. As a result, a bright color display can be achieved.

It is to be noted that a protective film or reinforcing layer can be provided on either of the first and second light transmitting layers 120, 310 as required.

A color pattern layer 100, lenses 124, and light blocking layer 350 can be easily formed by means of a transfer process in this preferred embodiment of the present invention. It is possible by means of the present method to achieve highly efficient use of material, a reduction in the number of production steps, and cost reduction.

Furthermore, once manufactured, the first to third masters 110, 20, and 300 can be used repeatedly insofar as durability allows. The steps required to produce the masters can therefore be eliminated from the production process for the second and subsequent optical substrates, thereby further reducing the number of production steps and helping to further reduce cost.

FIG. 13 is a section view showing an exemplary configuration of an LCD projector using a microlens array according to the present invention. This LCD projector comprises a lamp 400 as the light source, and a light valve 450 incorporating an optical substrate 410 according to the present invention.

The optical substrate 410 includes a first light transmitting layer 413 on which are formed lenses 411 and color recesses 412. The lenses 411 are convex lenses of which the convex surface is directed away from the light valve 420. The color recesses 412 are filled with pigment, forming a color pattern layer 414. Second and third light transmitting layers 415, 416 are formed over the lenses 411 and color pattern layer 414. A light blocking layer 417 over the second light transmitting layer 415 forms a black matrix. A reinforcing layer 418 is disposed to the third light transmitting layer 416. A fourth light transmitting layer 419 is disposed to the light blocking layer 417.

A transparent electrode film 420 and orientation film 421 are layered over the fourth transmitting layer 419 of the optical substrate 410. A TFT layer 422 is also disposed with a gap between it and the orientation film 421. The TFT layer 422 comprises transparent individual electrodes 423 and thin-film transistors 424 covered by an orientation film 425. The TFT layer 422 is disposed with orientation film 425 facing orientation film 421.

The space between orientation films 421 and 425 is filled with liquid crystal 426. The liquid crystal 426 is driven by a voltage controlled by the thin-film transistors 424.

With an LCD projector thus comprised, light 460 emitted from the lamp 400 is collected by the lenses 411 onto each pixel, thereby achieving a bright display.

It must be noted that a condition for achieving a bright display is that na<nb where na is the refractive index of second light transmitting layer 415 and nb is the refractive index of the first light transmitting layer 413. By satisfying this condition, light is incident from a medium with a high refractive index to a medium with a low refractive index. Light 460 is therefore refracted away from a line normal to the interface between the two media. A bright screen can therefore be achieved.

FIG. 14 is a section view of an exemplary LCD projector using a microlens array according to an alternative version of the invention. This projector comprises a lamp 500 as the light source, and a light valve 550 incorporating an optical substrate 510 according to the present invention.

The optical substrate 510 includes a first light transmitting layer 513 with lenses 511 and color recesses 512. The lenses 511 are concave lenses of which the concave surface is directed away from the light valve 520. The color recesses 512 are filled with pigment, forming a color pattern layer 514. Second and third light transmitting layers 515, 516 are formed over the lenses 511 and color pattern layer 514. A light blocking layer 517 formed on second light transmitting layer 515 forms a black matrix. A reinforcing layer 518 is disposed to the third light transmitting layer 516. A fourth light transmitting layer 519 is disposed to the light blocking layer 517.

A transparent electrode film 520 and orientation film 521 are layered over the fourth optical substrate 519 of the optical substrate 510. A TFT layer 522 is also disposed with a gap between it and the orientation film 521. The TFT layer 522 comprises transparent individual electrodes 523 and thin-film transistors 524 covered by an orientation film 525. The TFT layer 522 is disposed with orientation film 525 facing orientation film 521.

The space between orientation films 521 and 525 is filled with liquid crystal 526. The liquid crystal 526 is driven by a voltage controlled by the thin-film transistors 524.

With an LCD projector thus comprised, light 560 emitted from the lamp 500 is collected by the lenses 511 onto each pixel, thereby achieving a bright display.

It must be noted that a condition for achieving a bright display is that na'>nb' where na' is the refractive index of second light transmitting layer 515 and nb' is the refractive index of the first light transmitting layer 513. By satisfying this condition, light is incident from a medium with a low refractive index to a medium with a high refractive index, and light 560 is therefore refracted and converged to a line approximately normal to the interface between the two media. A bright screen can therefore be achieved.

What is claimed is:

1. An optical substrate, comprising:
   a light transmitting layer having a plurality of color recesses on one side and a plurality of lenses on another side, wherein the lenses are aligned with the color recesses; and
   a color pattern layer comprised of pigment disposed in the color recesses.

2. The optical substrate of claim 1, further comprising:
   a second light transmitting layer formed on the light transmitting layer and having a plurality of light blocking recesses; and
   a light blocking layer comprised of light blocking material disposed in the light blocking recesses.

3. The optical substrate of claim 2, wherein the light blocking layer is formed to enclose the lenses.

4. The optical substrate of claim 1, further comprising:
   a second light transmitting layer formed on the light transmitting layer; and
   a light blocking layer formed on the second light transmitting layer.

5. The optical substrate of claim 4, wherein the light blocking layer is formed to enclose the lenses.

* * * * *